(12) United States Patent
McNicholas (10) Patent No.: US 10,040,680 B2
(45) Date of Patent: Aug. 7, 2018

(54) COMPRESSED NATURAL GAS VEHICLE SAFETY SYSTEM AND METHOD

(71) Applicant: Daniel McNicholas, Oak Lawn, IL (US)

(72) Inventor: Daniel McNicholas, Oak Lawn, IL (US)

(*) Notice: Subject to any disclaimer, the term of this patent is extended or adjusted under 35 U.S.C. 154(b) by 0 days.

(21) Appl. No.: 15/406,223

(22) Filed: Jan. 13, 2017

(65) Prior Publication Data
US 2017/0233243 A1    Aug. 17, 2017

Related U.S. Application Data

(63) Continuation-in-part of application No. 15/257,030, filed on Sep. 6, 2016, now Pat. No. 9,919,663, which is a continuation of application No. 14/194,131, filed on Feb. 28, 2014, now Pat. No. 9,434,329, which is a continuation of application No. 13/463,022, filed on May 3, 2012, now Pat. No. 8,662,235.

(51) Int. Cl.
B67D 7/32    (2010.01)
B67D 7/04    (2010.01)
B67D 7/74    (2010.01)

(52) U.S. Cl.
CPC ......... *B67D 7/3218* (2013.01); *B67D 7/0401* (2013.01); *B67D 7/3209* (2013.01); *B67D 7/743* (2013.01); *B67D 2007/0444* (2013.01); *B67D 2007/0451* (2013.01)

(58) Field of Classification Search
CPC .............. B60K 28/10; B60K 2028/003; B60R 16/0232; B67D 7/3281; B67D 7/0401; B67D 7/3209; F17C 13/02; F17C 2265/065
See application file for complete search history.

(56) References Cited

U.S. PATENT DOCUMENTS

| 4,227,497 A | 10/1980 | Mathieson |
| 4,527,600 A | 7/1985 | Fisher et al. ...................... 141/4 |
| 4,881,581 A | 11/1989 | Hollerback ............ B60K 15/04 134/123 |
| 5,249,612 A | 10/1993 | Parks et al. ................... 141/219 |

(Continued)

FOREIGN PATENT DOCUMENTS

| DE | 10 2005 009 823 A1 | 9/2005 |
| EP | 1482292 B1 | 5/2014 |

(Continued)

OTHER PUBLICATIONS

PCT Int. Search Rpt and Written Opinion, PCT/US17/13600—dated Jun. 1, 2017.

(Continued)

*Primary Examiner* — Timothy L Maust
*Assistant Examiner* — Timothy P Kelly
(74) *Attorney, Agent, or Firm* — Clifford H. Kraft (57) ABSTRACT

A multiply-redundant system that protects fueling of rockets, aircraft and other vehicles using Liquefied Natural Gas (LNG) along with an oxidizer such as Liquefied Oxygen. One or more sensors in combination with one or more optional microswitches combine to detect any leaks, fire or explosion hazards quickly locking out further fueling. For different levels of safety, different combinations of sensors can be used.

20 Claims, 8 Drawing Sheets

(56) References Cited

U.S. PATENT DOCUMENTS

| | | | |
|---|---|---|---|
| 5,687,776 A * | 11/1997 | Forgash | F17C 5/007 |
| | | | 141/11 |
| 5,720,327 A | 2/1998 | Foster, Jr. | |
| 6,382,269 B1 | 5/2002 | Tatsuno | 141/94 |
| 6,712,171 B2 | 3/2004 | Farmer | 180/286 |
| 7,028,724 B2 * | 4/2006 | Cohen | F02M 21/0206 |
| | | | 141/392 |
| 7,195,093 B1 | 3/2007 | Ahmadi | 180/286 |
| 7,350,604 B2 | 4/2008 | Veenstra et al. | 180/69.4 |
| 7,412,994 B2 | 8/2008 | Corless et al. | 141/198 |
| 7,671,482 B2 | 3/2010 | Tighe | 307/9.1 |
| 7,896,036 B2 | 3/2011 | Kobayashi et al. | 141/94 |
| 7,970,528 B2 | 6/2011 | Janarthanam et al. | 701/114 |
| 9,434,329 B2 | 9/2016 | McNicholas | F17C 13/02 |
| 2002/0162601 A1 | 11/2002 | Jin et al. | |
| 2005/0001722 A1 | 1/2005 | Davis | B67D 7/3218 |
| | | | 340/540 |
| 2008/0185912 A1 | 8/2008 | Tighe | |
| 2008/0290152 A1 | 11/2008 | Lundgren et al. | |
| 2012/0095920 A1 | 4/2012 | McQuade | H04L 9/3215 |
| | | | 705/50 |
| 2012/0305127 A1 | 12/2012 | Roys et al. | 141/1 |
| 2013/0291825 A1 | 11/2013 | Sloan et al. | |
| 2014/0312683 A1 | 10/2014 | McNicholas | |

FOREIGN PATENT DOCUMENTS

| | | |
|---|---|---|
| JP | 2003014844 A | 1/2003 |
| WO | PCT/US13/039006 | 5/2015 |

OTHER PUBLICATIONS

Supplemental European Search Report EP 13 785108,5 dated Jan. 22, 2016, Supplied in Parent Case.

* cited by examiner

COMPRESSED NATURAL GAS VEHICLE SAFETY SYSTEM AND METHOD

This is a continuation in part of application Ser. No. 15/257,030 filed Sep. 6, 2016 which was a continuation of application Ser. No. 14/194,131 filed Feb. 28, 2014, now U.S. Pat. No. 9,434,329, which was a continuation of application Ser. No. 13/463,022 filed May 3, 2012, now U.S. Pat. No. 8,662,235. Application Ser. Nos. 15/257,030, 14/194,131 and 13/463,022 are hereby incorporated by reference in their entireties.

BACKGROUND

Field of the Invention

The present invention relates generally to the fields of vehicle safety and compressed natural gas and more particularly to safety system related to fueling vehicles powered by compressed natural gas.

Description of the Prior Art

Natural gas is becoming an abundant resource in the United States and several other countries. It is estimated that the natural gas reserves of the U.S. exceed the oil reserves of Saudi Arabia in terms of years of energy supply.

In order to utilize this resource effectively, and to replace crude oil, natural gas must be used in vehicles. Many fleet operators are switching their vehicles to natural gas since, with minor modifications, internal combustion engines run very well on natural gas.

Natural gas is typically supplied in two different forms: 1) as a compressed gas, and 2) as a liquefied gas. While more efficient in terms of the amount of gas that can be supplied in a single tank, liquefied gas is very dangerous to handle and requires highly specialized equipment to fuel with it and actually use it. On the other hand, compressed natural gas is relatively easy to fuel with and to utilize. Compressed natural gas can be supplied in pressure bottles a pressures between 3000 psi and 4000 psi. It is very well known in industry how to handle and fill such bottles. A natural gas "gas station" can fill a vehicle tank (pressure bottle) in just a few moments using fill techniques similar to high pressure air. A vehicle tank containing 100-200 cu. feet of natural gas at a pressure of 3500 psi is typically not more dangerous than a typical automobile's gasoline tank. The tank can be shielded from direct impact in an accident.

Many households and businesses in the U.S. have piped in natural gas for cooking and, in many cases, heating. Most Americans own at least one car or other vehicle, with many households owning several vehicles. This combination immediately suggests the possibility of filling a natural gas vehicle at home during the night for use the next day, or filling at the location of a small business. Because even a large compressed natural gas tank will not last as long between refills as a typical gasoline tank, it will become a very convenient to refill it during the night. The vehicle owner can also use natural gas filling stations; however, these will probably be more convenient for extended trips. Most people would prefer not to have to wait 5-10 minutes at a gas station to fill their vehicle. While exchangeable tanks are also possible, these require considerably more logistics and handling than a simple fixed onboard tank. Even with exchangeable tanks, the vehicle owner would still probably have to wait considerably longer to get a refill at a station than they currently do with gasoline.

At the present time, at least one car manufacturer is supplying a compressed natural gas vehicle and a home compressor to fill it. National fire codes currently prevent large gas storage tanks in homes or compressors that fill at fast rates. Given present standards, the home compressor will be directly attached to the vehicle via a high pressure hose, and the vehicle will take several hours to fill (depending on the size of the onboard tank). Again, this will be very conveniently accomplished during the night. The same arrangement can be used at small businesses, especially those with fleets of vehicles.

However, with numerous individuals filling natural gas vehicles in their garages at night or at their business locations, the potential for a very serious type of accident increases dramatically—namely what is called a drive-off accident. This is where the driver tries to drive away with the high pressure filling hose still attached to the vehicle. Such an accident in a home garage could be catastrophic if the fitting or valve on the vehicle is damaged, or if the compressor is pulled away from the home natural gas source. In either case, a considerably amount of gas could escape into the garage causing a fire or explosion danger. Also, even a "soft" drive-away accident, one where the driver stopped before breaking the hose or fitting could stress the fill hose and possibly cause small, very hard to detect, gas leaks. Such small leaks could result in the garage being filled with gas by morning.

Natural gas contains mostly methane and is thus lighter than air. Natural gas leaking in a garage will fill the garage from top to bottom. An explosive mixture for natural gas and air is between around 5% (for pure methane) and around 15-20%. Many garages contain furnaces and water heaters having open flames. As natural gas fills a garage, it can be easily ignited by a furnace or a water heater on a raised pedestal (fire codes require open flame devices in garages to mounted on pedestals to avoid gasoline vapor that might collect along the floor from a car gasoline leak). This is an ideal situation for a garage explosion. Hence anything that has the possibility of causing the release of natural gas or of causing a gas leak becomes a large danger. A drive-away accident is such an event.

Some techniques have been reported in the art to prevent a gasoline vehicle from starting at a gasoline station if the fill nozzle is still in the gas tank inlet. Among these are U.S. Published Application No. 2002/0162601 and U.S. Pat. No. 5,720,327. Other techniques have been invented to prevent pumping gasoline or other fuel if the fill hose is not in the fill inlet. Among these are U.S. Published Application No. 2008/0290152 and U.S. Pat. No. 4,227,497.

While these prior art techniques are useful for gasoline, they do not solve the problems associated with home or business filling a vehicle with high pressure compressed natural gas. In particular, a compressed natural gas tank is filled to a very high pressure (between 3000 and 4000 psi). A leak or disconnect of a fitting or valve on such a pressure vessel can cause a tremendous pressure explosion that can act like a bomb (this can happen with any compressed gas including air). Also, a very small leak at high pressure can cause a large quality of gas to escape. For example, an exploding tank can send metal fragments in all directions with enough force to penetrate the house and the driver's compartment of the vehicle. This can happen before there is any fire. After that, the tiniest spark could ignite the now explosive and highly flammable gas cloud reducing the house or business to rubble. Even a quick-disconnect hose does not typically solve the problem since the driver may attempt to drive away very quickly still damaging the fittings, tank, hose, compressor and/or natural gas supply.

It would be very advantageous to have doubly or triply redundant system and method that prevents the driver from ever starting the vehicle when the filling hose is attached and a safety valve is not in the correct position.

SUMMARY OF THE INVENTION

The present invention relates to a multiply-redundant system and method for preventing a driver from starting or moving a compressed natural gas vehicle if the high pressure gas fill system is not correctly and completely disconnected from the vehicle.

In one embodiment of the invention, multiple electrical proximity sensors, or other sensors, in combination with one or more optional mechanical microswitches combine to lock-out the vehicle's ignition or otherwise disable the vehicle. For different levels of safety, different combinations of sensors can be used, with the lowest level having a single sensor sensing the presence or absence of a fuel supply fitting. The highest level of safety according to the invention is to have separate sensors, such as proximity sensors, on the fuel fill hose fitting, the gas cap cover and a manual safety or isolation valve along with a redundant microswitch on at least one of the components. The ignition, transmission or other function can be locked out by an electrical or mechanical lockout provided to the vehicle's computer by the manufacturer, or by a simple series electrical circuit in the ignition string. The safest system could use both techniques.

In addition, the vehicle's computer, or another simple electrical circuit, could provide a visual and/or audio indication that one or more of the sensors was indicating an attached fuel hose. The alarm could be activated the instant the driver inserts a key into the ignition. Under the present invention, it is understood that there is a possibility that one of the sensors might fail in a state that indicates the fuel hose is connected when, in reality, the system is entirely safe. In this very special case, the present invention provides a technique for the driver, on a limited-time basis, to override the sensors and start the engine or move the vehicle using a supplied override. Having this feature allows the driver to drive to a mechanic to have the problem fixed. This feature could be automatically disabled by an abuse preventer after a predetermined number of uses (such as three times) to keep a driver with a bad sensor from delaying getting it fixed. Finally, an optional break-away fitting can also be provided in addition to the other features of the invention for a final level of protection.

DESCRIPTION OF THE FIGURES

Attention is now directed to several drawings the illustrate features of the present invention.

Several drawings and illustrations have been presented to aid in understanding the present invention. The scope of the present invention is not limited to what is shown in the figures.

DETAILED DESCRIPTION OF THE INVENTION

Figure 1A:
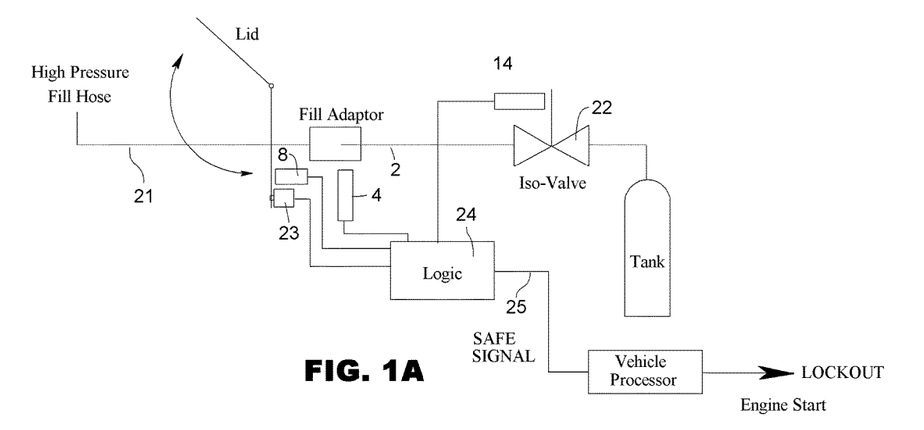
FIG. 1A shows a block diagram of an embodiment of a high-safety lock-out system according to the present invention.

The present invention relates to a system and method that provides a lockout out to a vehicle's ignition, transmission or other means of moving the vehicle when a high pressure compressed natural gas fuel hose is attached to the vehicle an/or the fill cap is open. FIG. 1A shows a block diagram of an embodiment of such a system. A compressed gas fuel fitting 2 accepts a high pressure filling hose 21 that allows filling through an isolation valve 22. The isolation valve 22 can be manually opened, or it can be opened mechanically when a panel lid or "gas cap" is opened. A sensor 4, which can be an electrical proximity sensor, senses the presence of the fitting part of the high pressure filling hose 21. An optional second sensor 8 senses that the panel or gas cap is open. An optional third sensor 14 can sense the position of an isolation valve 22 (on vehicles that have such a valve). All of the sensors can be magnetic, optical or ultra-sonic proximity sensors, or any other sensors, and use any method of sensing proximity or that a particular mechanical part is or is not in a particular position. One or more optional mechanical microswitches 23 can provide a backup to one or more of the sensors.

Figure 1B:
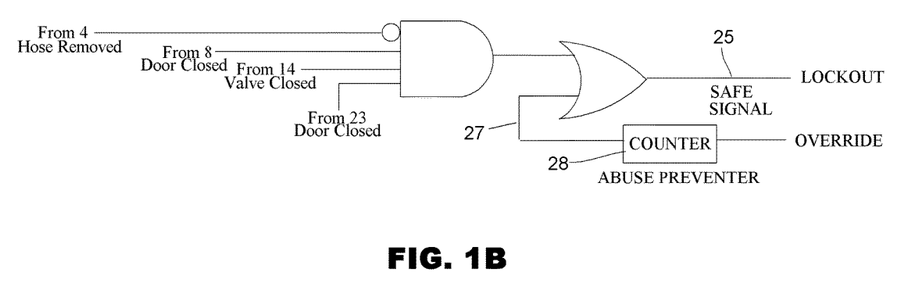
FIG. 1B shows a logic circuit that can combine sensors inputs.

A further logic circuit 24 or other lockout which can be a separate unit, or part of the vehicle's processor, can combine the inputs from all the sensors 4, 8, 14, and the optional microswitch 23 to produce a safe signal 25 that will allow the vehicle ignition to start the car, or otherwise allow the vehicle to move. FIG. 1B shows a schematic representation of this circuit 24. Here, each sensor's signal is amplified and conditioned and fed into an AND logic circuit 26. If any of the sensors is in an unsafe condition, the AND circuit 26 will not produce a "safe" signal. The particular circuit of FIG. 1B assumes that a proximity sensor has a logic high when there is proximity, and that the microswitch is high when the lid is closed. Any other logic levels or configurations can be used. In particular, a program in a microcontroller or other processor could also make the determination. As is well understood in the art, an OR circuit could also be effectively used instead of an AND circuit. Any circuit or program that combines sensor inputs to make a "safe" determination is within the scope of the present invention.

FIG. 1B also shows an override 27 that can be used to force a "safe" condition when one of the sensors is in an unsafe state. This circuit is optional but, when provided, allows the driver to drive to a mechanic with a failing sensor. A counter 28 or other abuse preventer prevents the override from being used more than a predetermined number times before repairing the sensor (for example three times). The counter 28 can be optionally reset whenever the sensor logic produces a safe signal. In the present example, the driver can enter a special PIN code 29 to activate the override and override the sensors. While providing this circuit lowers the overall safety threshold of the system slightly, the act of performing the override can be made difficult enough that a driver will not routinely use it to avoid having to fix a faulty sensor. Optionally, the override could be restricted to use only by a certified mechanic. In this case, the driver would not be allowed to operate it. While a simple override switch can be used, for additional safety, a PIN or barcode or any other unique identification 29 might be required. If a PIN is used, a PIN entry method can be used such as a keypad or a card swipe. If a barcode is used, a small barcode reader can be supplied.

Figure 2:
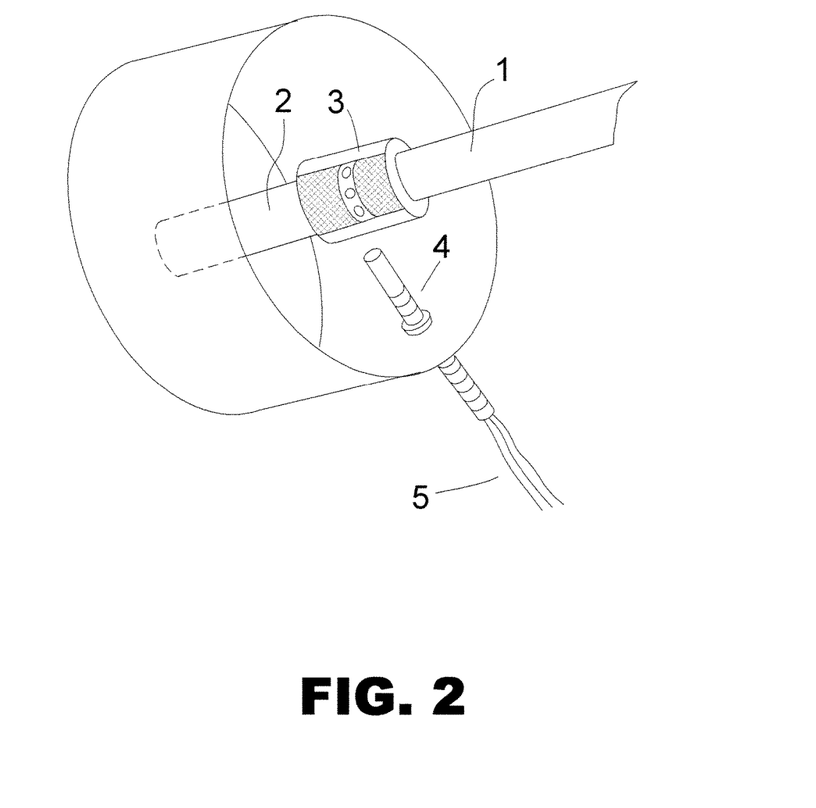
FIG. 2 shows a detail drawing of a fill fixture with a proximity sensor.

FIG. 2 shows a male tank adapter 2 on the vehicle with a coupled (usually spring coupled) female filling locking coupler 3 and high pressure feed hose 1. The feed hose 1 typically originates at a compressor or storage tank. A proximity sensor 4 with electrical connections 5 senses the presence of the feed hose (unsafe condition). The female locking coupler 3 typically has a connect/disconnect fitting that clamps the tank adapter 2 and makes a high pressure, leak-proof connection. It should be noted that the female filling locking coupler 3 could be a quick-release, breakaway fitting. This would add a final mechanical precaution to the system where the hose would manually break free in the case that somehow the rest of the system failed.

Figure 3:
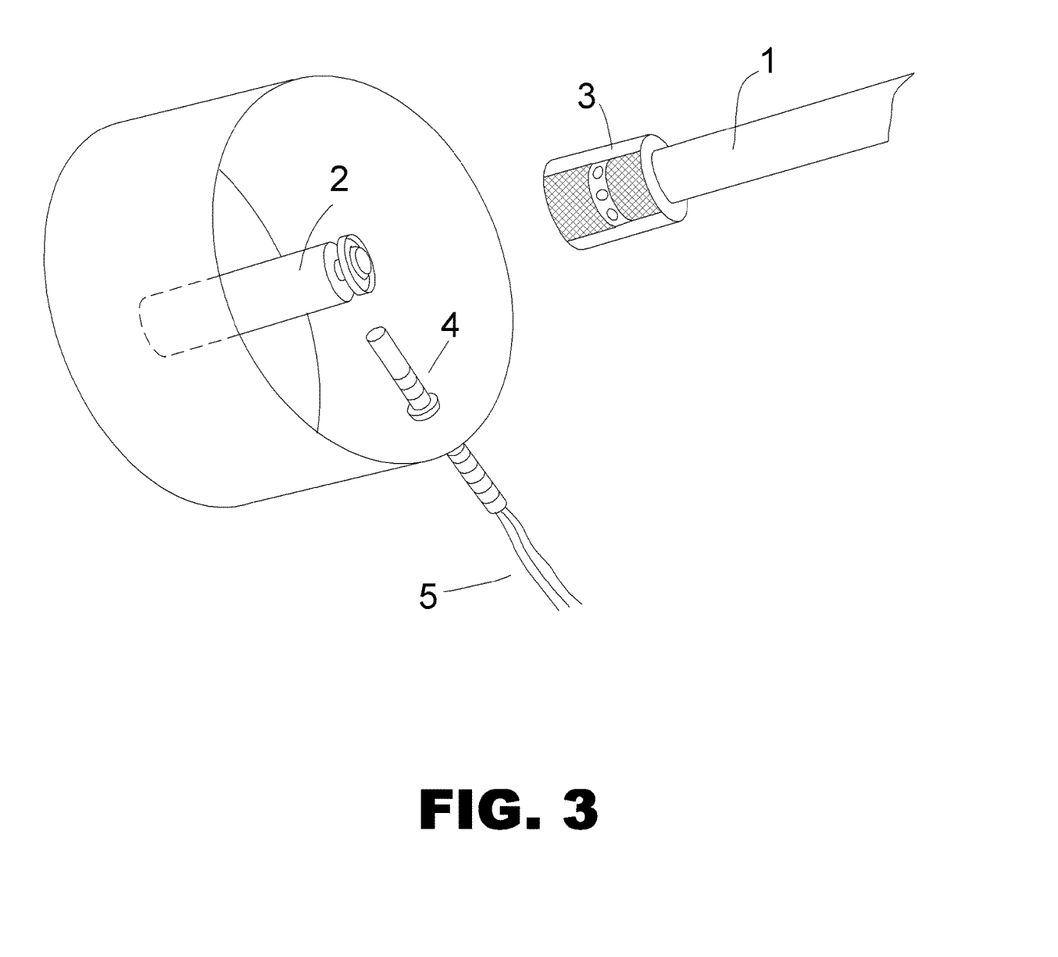
FIG. 3 shows the system of FIG. 2 with the high pressure fill hose removed.

FIG. 3 shows the same setup but with the feed hose 1 and the female locking coupler 3 uncoupled and withdrawn (safe position) from the male filling adapter 2.

Figure 4:
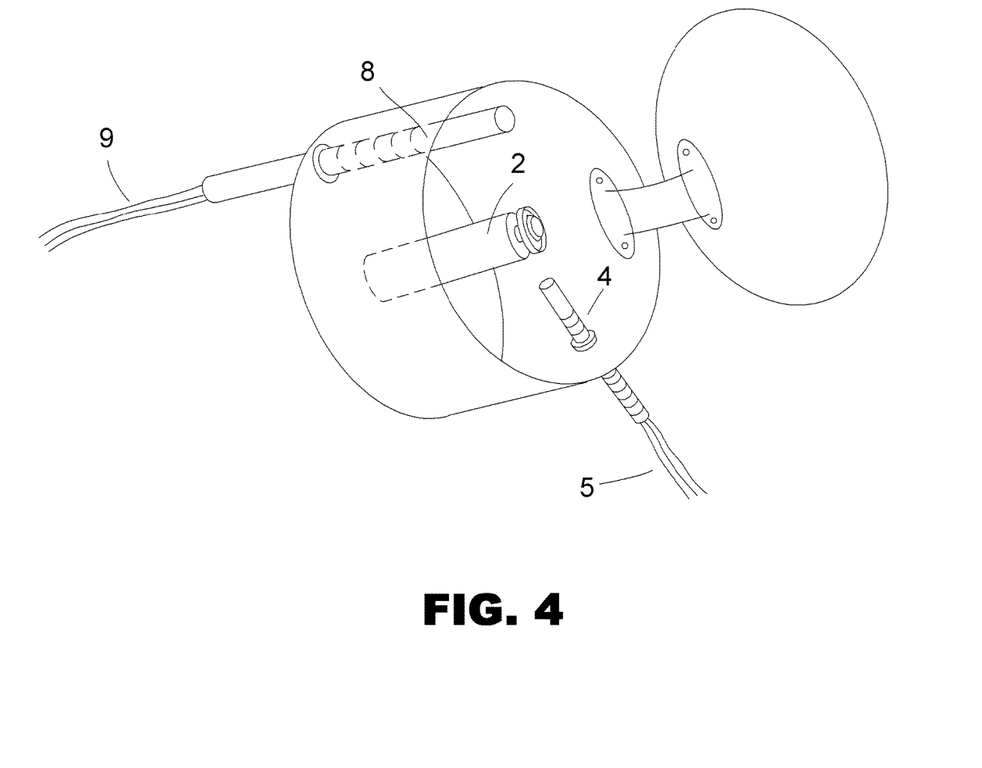
FIG. 4 shows a system similar to that of FIGS. 2-3 with an additional gas cap sensor.

FIG. 4 shows a fill cavity 6 and fill access lid 7 that swings open on hinges. A second proximity sensor 8 has a second electrical feed 9. This sensor 8 can be used in embodiments of the invention either alone or in conjunction with the feed hose sensor 4. An optional microswitch 20 is also shown.

Any type of sensor can be used with the present invention. A preferred sensor is a magnetic or optical proximity sensor; however, other sensor types can be used such as ultra-sonic sensors and others.

Figure 5:
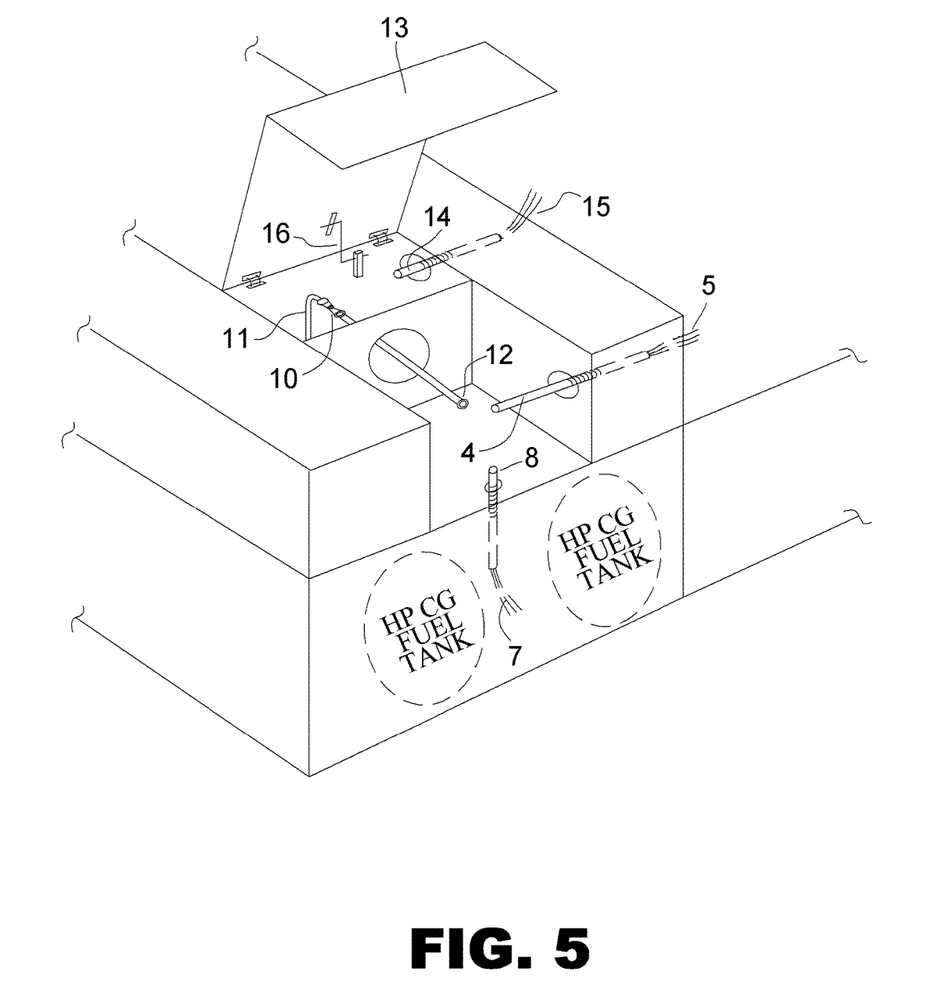
FIG. 5 shows a panel-type filling system with an isolation valve and three proximity sensors.

FIG. 5 shows a different arrangement of the fueling system. This type of system is more commonly found on trucks and larger vehicles. A panel 13 opens and closes to allow access to a tank adapter 12. An isolation valve 10 can be manually operated or can operate in conjunction with a lever 16 on the panel 13. A third proximity sensor 14 with electrical feed 15 can be used to sense whether the panel is open or closed (and hence, if the lever 16 is used with the valve 10, whether the valve is open or closed). The valve 10 isolates the tank adapter 12 from the tank when the panel is closed.

Figure 6:
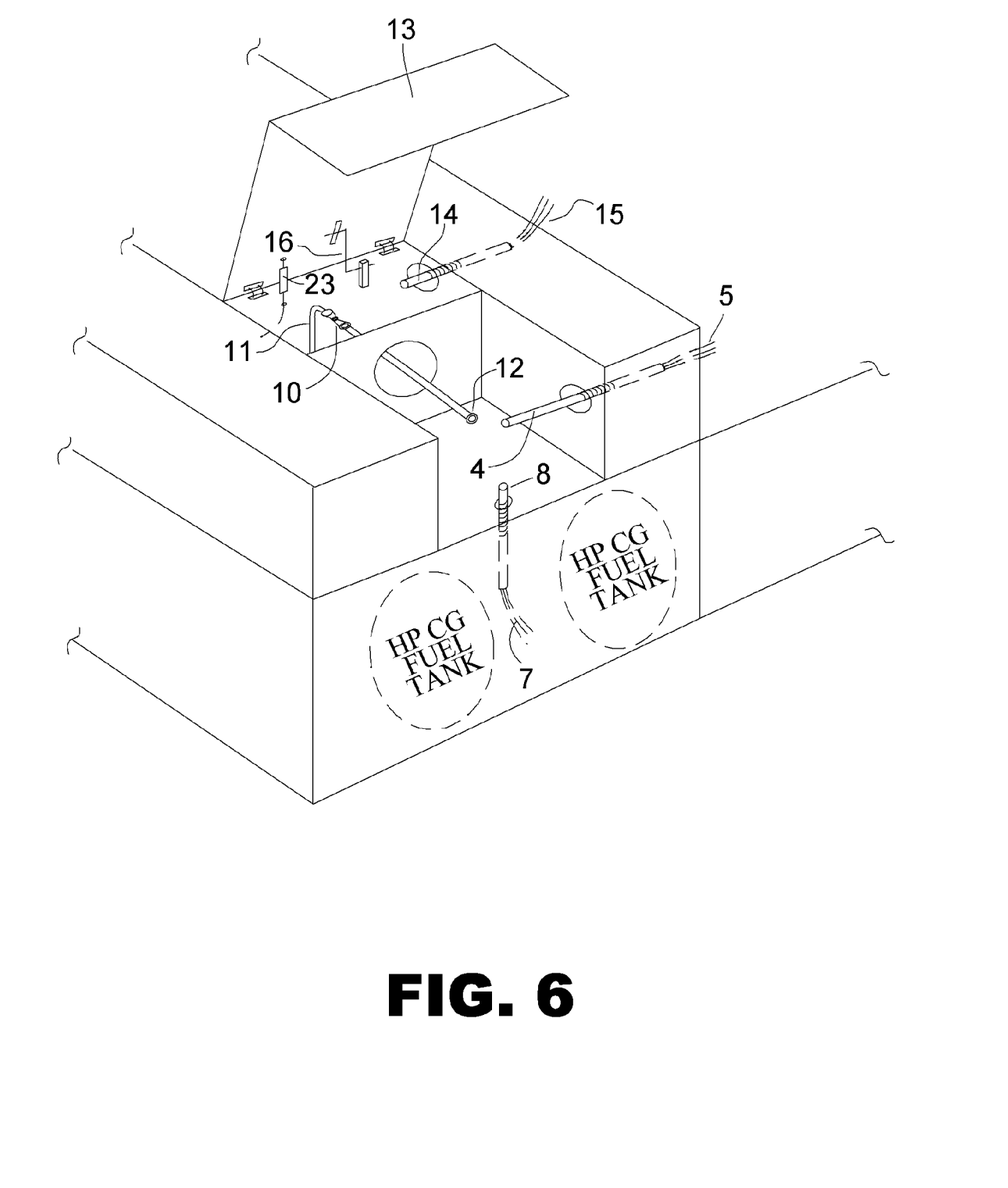
FIG. 6 shows the system of FIG. 5 with an additional mechanical microswitch.

FIG. 6 shows the same embodiment as FIG. 5 except that an optional microswitch 23 has been added to the panel 13. This is a simple mechanical backup that does not rely on proximity sensors. It should be noted that any of the proximity sensors shown in the various embodiments of the present invention may be replaced by microswitches or other mechanical devices, or each proximity sensor may be optionally backed up with an additional microswitch. In addition, FIG. 6 shows an optional additional microswitch 21 on the isolation valve 10.

It should be noted that an optional natural gas leak sensor can also be included with the system of the present invention to provide an addition source of safety. Such a sensor could keep the vehicle in a disabled state if an unreasonable concentration of free natural gas is sensed. Such a sensor could also sound an alarm on the vehicle or on the compressor. It is also possible that any of the above-mentioned sensors or circuits can communicate with the lockout or other logic wirelessly such as by radio or light. Finally, it should be noted that a processor with memory and a stored program can perform the logic function of the lockout, override and/or abuse preventer. This can also be any digital or analog logic circuit or simply relays. In addition, an internet or network interface can be provided to remotely report or log the status of the system. This feature can be useful for fleet operators to track safety, for example, the number of attempts to drive off under a lockout condition or the number of overrides.

The present invention provides a multiply-redundant system to enhance the safety of home or business fueling of compressed natural gas vehicles. It can also be used on vehicles using propane or any other compressed gas fuel. A system of one or more sensors determines if the fueling system is in a safe state. This can be a state with the high pressure fill hose removed, the fueling compartment access lid closed, and any isolation valve in the correct position. A lockout prevents either the vehicle from starting or otherwise makes it impossible to move the vehicle when the system is not in a safe state. In order that a driver can get a faulty sensor repaired, an override can be provided that allows the safety sensors to be overridden and the vehicle moved. This override can be equipped with an abuse preventer that only allows the override to be used for a predetermined number of times before the override itself is disabled. This prevents a driver from putting off getting a faulty sensor repaired. An audio and/or visual indicator can sound or display when the driver inserts the key into the ignition in an unsafe state, or alternatively, when the driver turns the key to start.

In the present invention, a lockout is any method, means or technique to prevent a vehicle from moving including a circuit or module that can disable the ignition or transmission or disable the vehicle in any other way. An override is a any method, means or technique to allow the vehicle to move in spite of the lockout—any way of overriding the lockout. An abuse preventer is any method, means or technique to prevent abuse of the override by limiting the number of times (especially successive times) it can be used.

In natural gas fueling, be it compressed or liquefied gas, any excessive motion of the vehicle being fueled (car, truck, train, ship, barge or any other vehicle), cannot be permitted. Such motion indicates a condition that should lead to a shutdown of the fueling operation and, in many cases, an automatic disconnect of all fueling lines from the vehicle as well as possible release of the vehicle.

To detect omni-directional vehicular movement/distances, multiple sensors may utilized to perform different functions, standing alone or in a cascading control system to perform a vehicle lock-out or automatic fueling line disconnect. The use of one or more sensors in combination with one or more micro-switches, combine to automatically mitigate excess movements, initiate the lock-out and close isolation valves to prevent/disable fuel flow/transfers. The sensor(s) such as optical and or ultrasonic that detect excessive movement (above or greater than predetermined stop limits) can be sensors such as laser or radar measurement sensors, or can simply be accelerometers coupled to processing units to compute motion. Use of one or more of these sensor, or possibly multiple sensors, creates the safest condition to initiate mitigation of fuel transfers, by maintaining other systems in a lock-out state, and activating one or more audible and/or visual alarms. The fuel flow system can be reactivated by an operator. Different vehicles may require different parameters to initiate such motion lock-outs. For example, highly excessive movements can relay, trigger or enable an override system to disabling the lockout system(s), but keeping fuel flow isolation valve(s) closed (safe state) and liberating vehicle(s) until proper control/conditions are achieved and or exist. Such a condition can de-activate or activate any vehicle or automatic fueling release system that may exist, or initiated by lock-out. Multiple variations can be used, with multiple steps and sequences to maintain the safe state. With isolation valve(s) in a closed position, and if predetermined conditions exist, vehicle movement may be allowed by automatic activation of the override.

For example, a barge being fueled by natural gas begins to slip away, or begins to roll and pitch beyond a certain limit. The above-described motion sensors, along with processing, can determine a course of action. If the motion is within certain bounds, only the fueling system needs to be shut down; however, for greater motion or slip-away, not only does the fueling system need to be shut down, but the fueling lines need to be automatically disconnected from the barge.

Fires or explosions of any type during fueling are also a danger signal that all fueling operations should cease. To detect hazardous fire conditions, the use of one or more sensors in combination with one or more micro-switches can combine to automatically close the isolation valve(s) to prevent and/or disable fuel transfers and activate audible, visual, and communication links like fire alarms, pumps, and fire suppression systems. Such sensors such as optical or magnetic can detect infrared, ultraviolet, heat, or a rate of rise in temperature. Such devices can activate fire alarms and the like. Any fire/flame scanners or laser sensors, fusible/friable links are within the scope of the present invention. This includes any means to detect fire hazards. Complex (multiple or higher level) resets are typically required for fire system such as both a key and code. The sensors described may also be used in conjunction with standard fire detection systems as a cascade of controls.

To prevent enhancement of the dangers of further fire or explosion; an optional relay or digital or analog logic function that is activated by a fire detection system of one or more optical, magnetic, ultrasonic sensors or links in combination with one or more micro-switches combine to provide and/or trigger/ENABLE an override thus disabling the lock-out system(s) and liberating the vehicle(s) while fire or explosion risks exist. This enables the vehicle(s) to be moved away from the fire or explosion source, or away to distance itself from spreading further fire or explosion dangers, whether another fueling vehicle is present, or fueling is taking place from a storage vessel. Optical sensor(s) such as infrared, ultraviolet, individually or combined, can sense fire and/or heat; also sensor(s) such as rate of temperature rise and ionization can detect excessive temperature and smoke. Fusible/friable links/plus other sensors such as an acoustical or ultrasonic sensor system receiver(s) can detect loud sudden noises/sound waves such as those created by a rapid expansion of molecules in a confined environment, or explosions. Any sensor activation usually also initiates the system to close the isolation valve(s), and stop/mitigation of fuel flow transfers; plus de-activate or activate any vehicle or automatic fuelling release systems that may exist, or release one initiated with a lock-out.

All motion and fire/heat sensors are generally coupled to a processor. The processor executes stored instructions from a memory, and makes decisions using artificial intelligence techniques to determine a course of action. As stated, the action might just be a fueling shutdown, or it might be a complete disconnect of the fueling system from the vehicle. The sensors and/or processor can be part of the fueling supply system apparatus, or they can be on the vehicle, or both.

The use of optical sensor(s) such as infrared temperature or fiber optic sensors to detect the presence or absence of a Liquefied Natural Gas cryogenic temperature, or temperature differential detection, can determine the presence or absence in fueling lines, and thus a relay or digital or analog logic function combine to disable and produce a vehicle lock-out. These can also be flow switches or flow meters with transmitters. The above-listed sensors sense the presence of the natural gas fill hose in proximity to a tank fill adapter coupled to a natural gas tank.

The use of magnetic sensor(s) such as "Mag-Meter", Coreolsis flow meter (U-Tube), density meter (LVDT/strain gauge), or mass flow (temperature/pressure compensated flow meter), plus other methods of indicating flow are within the scope of the present invention. The above-listed sensors sense presence of a natural gas fill hose in proximity to a tank fill adapter coupled to a natural gas tank. These sensors produce a signal or relay either digital or analog Logic function that combines to produce a vehicle lock-out signal.

The use of ultrasonic sensor (sensors) such as flow meter, which can be an external type that clamps or monitors from exterior of flow line, or it can internally measure flow with-in lines (submersed) is also within the scope of the present invention. Also any other method that utilizes ultrasonic, radar, or other waves for detection/proximity is within the scope of the present invention. Ultrasonic sensors sense the presence of a natural gas fill hose in proximity to a tank fill adapter coupled to a natural gas tank, and sense or guide manual and/or automatic fuelling systems to sense proximity, or that a particular mechanical part is, or is not, in a particular position; such as a fueling rack, tray, arm, hose, articulation or extension of hose-line or fuelling devices and/or connections.

The use of optical sensors, such as infrared, ultraviolet, laser, fiber optic, visible or non-visible light to detect the presence of a natural gas fill hose in proximity to a tank fill adapter coupled to a natural gas tank is within the scope of the present invention. These sensors can measure interference of a light beam, distance, obstruction, light differential, existence or non existence, proximity, and whether a part is, or is not, in a particular position The optical sensors can have transmitters that communicate wirelessly such as by radio or light. The sensors can guide manual and/or automatic fuelling systems with a natural gas fill hose to sense proximity, or that a particular mechanical part is or is not in a particular position; such as a fuelling rack, tray, arm, hose, line, articulation, or extension of hose-line or fuelling devices and/or connections.

Also any standard temperature sensors, pressure sensors or flow transmitters can be used to sense presence of a natural gas fuel fill hose in proximity to tank fill adapter coupled to a natural gas tank. All the above sensors can have transmitters that may communicate wirelessly such as by light or radio. Different level resets can be made available for operators to reset various system upsets.

All the above safety systems, sensors, relays, triggers, micro-switches, over-rides, lock-outs, resets, and events should be continuously recorded, plus all logged logic data is identified (I.D.'d) all with current time and date stamps, and will be available for print-out if needed. Data recording can be local or remote, or both. Data can be transmitted wirelessly to a remote location and can be transmitted over a network such as the Internet if desired.

Figure 7:
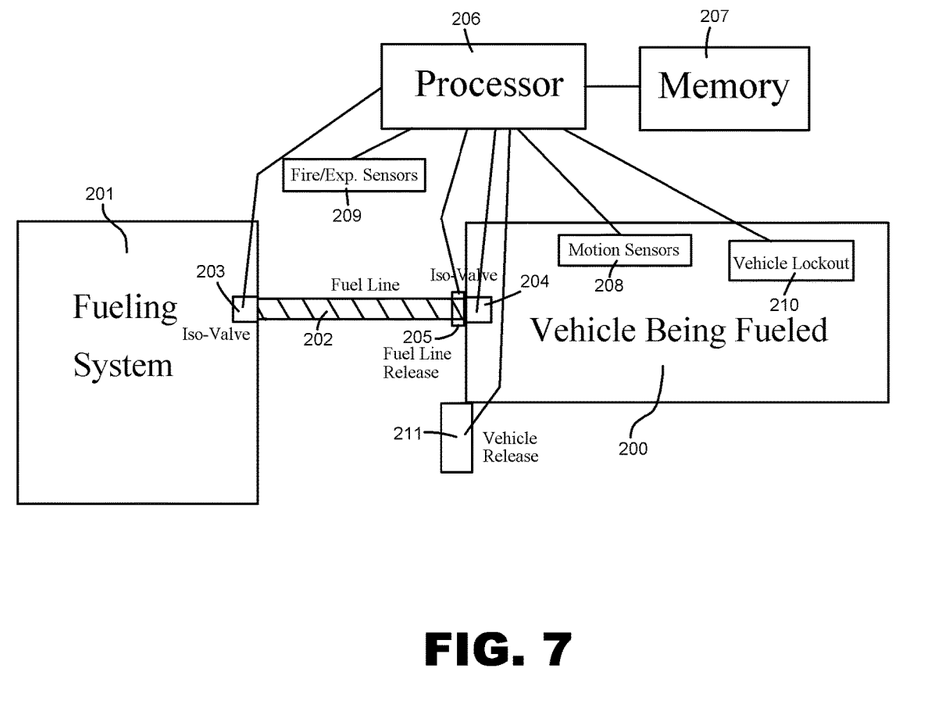
FIG. 7 shows a motion and fire system used with natural gas fueling.

Turning to FIG. 7, a vehicle being fueled 200 can be seen attached to a fueling system 201 with a fuel line 202 that passes between isolation valves 203 and 204 on the system and vehicle respectively. There is an automatic fuel line release 205 and an automatic vehicle release 211. Some vehicles, such as land vehicles, may not have an automatic vehicle release. However, trains and marine vessels usually will have. A processor 206 with memory 207 executes stored instructions. The processor 206 interfaces with fire and explosion sensors 209 and motion sensors 208. The processor executes artificial intelligence routines or other algorithms that allow determination of when there is too much vehicle motion, and if there is a fire or explosion. If a determination is made of too much motion, the isolation valves 203 and 204 can be automatically shut off. In more severe conditions such as extreme or slip-away motion, the fuel line 202 may be released from the vehicle via the fuel line release 205, and the vehicle 200 may be released from the fueling system via the vehicle release 211. In the case of a land vehicle, the vehicle lockout 210 may be over-ridden by the processor 206 so the vehicle can be started and/or moved. It is understood, that the processor 206 may be in the vehicle 200, part of the fueling system 201, or split between the two as two separate processors. Given the numerous possible danger conditions or scenarios, the processor programming should be able to evaluate and act on many different sensor-reported conditions.

As stated, the present invention relates generally to the fields of vehicle safety and compressed as well as liquefied gases, More particularity to safety systems related to natural gas powered vehicles such as spacecraft, launch rockets, and aircraft utilizing a multiple redundant system and method for preventing an operator, driver, or pilot from starting or moving a compressed gas vehicle with oxygen trim if the high pressure gas fill systems are not correctly and completely disconnected from the vehicle.

Today, a wide array of inner-space and outer space travel are providing launch vehicles, spacecraft, rockets, subsonic and supersonic vehicles; some with rocket bi-propellant engines and some with hybrid propulsion (natural gas turbine-generator), others have turbo fan, some with afterburners, and even ramjet engines for cargo transport, satellite launching, exploration, probe vehicle transit, and human transfers to Various locations in space (International Space Station) and faster, more efficient global transits/travel. These vehicles (spacecraft/both inner and outer) possibly bound for multiple planets, for various exploration, observation, security, and transit are now being fuelled with natural gas (in liquefied state) (LNG), or the natural gas chemical family (such as ethane, propane, hydrogen, butane, and other compounds).

It is well known and understood that natural gas composition varies from different regions, and pure methane (also considered natural gas) is more process intense to scrub/refine/produce.

It is also well known in fire sciences that the combustion triangle requires three elements:
1) FUEL 2) Oxygen 3) Ignition Source In order for natural gas fuelled rocket propulsion to achieve the proper specific Impulse; natural gas fuel must utilize an oxidizer such as oxygen, directly supplied or derived from an oxidant. Oxygen can also be compressed, scrubbed, refrigerated and condensed into a liquid state, to maximize storage space. Liquid oxygen (LOX) vaporized into pure oxygen gas can be mixed with vaporized natural gas fuel. This oxygen enriched fuel produces a clean, green, excellent propellant for rockets, spacecraft, aircraft vehicles.

Liquidified natural gas (LNG) has several advantages for these modern vehicles:
1) Liquidified natural gas is more dense than other existing fuels; therefore, reducing fuel tank size.
2) Liquidified natural gas is very close in temperature to that of liquidified oxygen, simplifying storage, which was a major engineering obstacle.
3) Natural gas turbine! internal combustion engine driven turbo pump seals need only have a narrow temperature band, reducing temperature differential issues.
4) No ullage gasses are necessary due to the higher vapor pressure of liquidified natural gas.
5) Natural gas is less evaporative in space, thus increasing efficiency.
6) Natural gas and oxygen have a positive chemical affinity.
7) Natural gas is green and more environmentally friendly, and non toxic than other fuels.
8) Methane can most probably be harvested on Mars, Titan, Jupiter, and other planets; providing missions with return fuel.

Commonly developed spacecraft/vehicles of various makes, models and propellants exist, each entity having various promises, but all share the same goal: SAFE, EFFICIENT, spacecraft/vehicles. Natural gas and oxygen can be handled safely, utilizing the Best Available Technologies. Intelligent systems, utilizing intrinsically safe sensors can mitigate risks during fuelling, and filling of oxygen or fuel enrichment and the natural gas fuel itself.

During fuelling events, or anytime fuel and or oxygen is present, proper atmospheric monitoring systems and controls can mitigate risk of deflagration detonation and explosion. Monitoring, both CH4 and O2 (deprivation and enrichment) atmospheres is an absolute for safety. Optical sensors such as fiber optic sensors, both closed cell, and open path, may be used along with electro-chemical detection. These sensors all may communicate wirelessly either by radio or light with one or more central or remote systems. Analyzers may also be utilized to perform atmospheric monitoring. Systems such as Ramen Spectroscopy methods are within the scope of this invention.

Natural gas in air has a Lower explosive limit (LEL) of 5%; and an upper explosive limit (UEL) of 15%. However, when pure oxygen is present, the LEL remains approximately 5%, but the Upper Explosive limit Is increased to between 59% to 61% (depending on natural gas composition). With the introduction of pure oxygen, the atmosphere is orders of magnitude more dangerous, because oxygen also Lowers the Ignition temperature and energy required for ignition. A fuel, oxygen, or both leak will enrich the surrounding atmosphere which can have disastrous consequences. The smallest spark, arc, rapid pressurization, acoustical resonance, friction, or even spontaneous combustion may ignite the now flammable/highly combustible-explosive mixture into a runaway exothermic reaction, or rapid expansion of molecules in a confined or unconfined space in an instant. An optical fiber optic sensor for oxygen detection alone or in combination with spectrometer is able to detect oxygen levels of from 0% to 100%. For methane, an optical/fiber optic sensor alone, or in combination with spectrometer, will detect L.E.L. with a range of 0% to 100% of explosive limits. The preferred method is to combine both types of sensors into a single analyzer to process different L.E.L ranges corresponding to different oxygen levels.

Safely containing the fuels and oxidizers at all times is critical, but during Fuelling, it is paramount. Safe vehicle disengagement/lock-out, preventing ignition or movements utilizing one or more sensors in combination with one or more micro switches that can be optical, magnetic, or ultrasonic is within the scope of this invention. For different levels of safety different combinations of sensor may be used, with the lowest level having a single proximity sensor sensing the presence or absence of a high pressure fill hose. The highest level of safety is achieved by having separate proximity sensors on the fuel and oxygen fill hose fittings, gas cap covers, and a manual or automatic safety valve with a redundant micro switch. An optional over-ride that may be restricted as to the number of times it can be used can allow starting with a faulty sensor in order to allow maintenance. This system should be active during both test stand firings and actual launch or flight take/lift offs. Some countries have enacted "NO FLY" Zones perimeters over LNG facilities.

In order to detect omni-directional vehicular/Space/aircraft movements/distances, multiple sensors may perform different functions alone, or in a cascading/subroutine control system to perform a vehicle/space/aircraft "LOCK-OUT". The use of one or more sensors in combination with one or more micro-switches or other switches combines to automatically determine when threshold limits are exceeded, and can initiate a "LOCK-OUT" of the fueling system closing isolation valve/valves to prevent/disable fuel/oxidizer flows/transfers. The sensors, such as optical, magnetic, ultrasonic, accelerometer, or others may detect any or excessive movement of the vehicle (above or greater than predetermined limits). One or more sensors, or all of these sensors combined, can monitor and control fuel and oxidizer flows and instantly switch the system to a "LOCK-OUT" state, as well as activating one or more visual and/or audible alarms. Usually fuel/oxidizer flow can be reactivated by operator when a safe condition is assured.

Different vehicles may require different types of controls. For example, excessive movements may relay, trigger, or enable an "OVER-RIDE" system, thus disabling the "Lock-Out" system(s), but will keep fuel flow isolation valve(s) closed (safe state) and liberating the vehicle(s) until proper control and conditions are achieved. In addition, they can de-activate or activate any vehicle or automatic fuelling release system that may exist, or any initiated by lock-out. Multiple variations can be used with multiple steps and sequences to maintain a "Safe State" with isolation valve(s) in a closed position, and if predetermined safe conditions exist, vehicle movement can be allowed by automatic activation of an "OverRide".

To detect hazardous fire conditions, the use of one or more sensors in combination with one or more micro-switches combine to automatically close the isolation valve (valves) to prevent/disable fuel flow! transfers, and activate audible, visual, communication links, fire alarms, pumps, and fire suppression systems. Sensors such as optical or magnetic and the like can detect infrared, ultraviolet, or a rate of rise of temperature. These devices can activate fire alarms, plus any other fire/flame scanners/laser sensors, as well as fusible/friable links that can also included. Any means, sensor or technique to detect a fire hazard are within the scope of the present invention including, but not limited to, complex (multiple or higher level) resets required for fire systems such as both keys and codes.

To prevent enhancing/enhancement of the dangers of further fire or explosion, an optional relay or digital or analog logic function that is activated by a fire detection system of one or more optical, magnetic, ultrasonic sensors or links in combination with one or more micro-switches can combine to provide a Lock-Out or override a Lock-Out. The override liberates vehicle(s) while fire or explosion risks exist, enabling vehicle(s) to be moved away from fire or explosion source or away to distance itself from spreading further fire or explosion dangers.

Optical sensors such as infrared and ultraviolet, individually or combined, can sense fire and or heat. Also sensors such as rate of rise and ionization can detect excessive temperature and smoke. Fusible/friable links! plus other sensors such as an acoustical or ultrasonic sensor system receivers can detect sudden loud noise/sound waves such as those created by a rapid expansion of molecules in a confined environment, or explosions. Any sensor activation can also cause the system to close the isolation valve(s) and stopping/mitigation of fuel flow transfers; plus de-activate or activate any vehicle or automatic fuelling release systems that may exist or having been initiated with a Lock-Out.

The use of optical sensors such as infrared temperature sensors or fiber optic sensors to detect the presence or absence of Liquefied Natural Gas/oxygen, cryogenic temperatures, or temperature differentials can determine presence or absence in fueling lines of LNG. Thus, a relay or digital or analog logic function can combine to disable and produce a vehicle "Lock-Out". This can also be include either a flow switch or a flow meter with a transmitter. The above listed sensor sensors can also sense presence of a natural gas/oxygen fill hose in proximity to a tank fill adapter coupled to a natural gas/oxygen tank.

The use of magnetic sensors such as "Mag-Meter", Coreolsis flow meter (U-Tube), Density meter (LVDT/strain gauge), or Mass Flow (temperature/pressure compensated flow meter) plus other methods of indicating flow are within the scope of the present invention.

Ultrasonic sensors such as a flow meter which can be an external type that clamps or monitors from exterior of a flow line, or can internally measure flow within lines (submersed), may also be used. Other methods that utilize ultrasonic, radar, or other acoustical waves for detection/ proximity are within the scope of the present invention. These ultrasonic sensors sense the presence of a natural gas/oxygen fill hose in proximity to a tank fill adapter coupled to a natural gas/oxygen tank, and sense or guide manual and or automatic fuelling systems to sense proximity or that a particular mechanical part is or is not in a particular position. This may be a fueling rack, tray, arm, hose, articulation, or extension of hose/line or fuelling devices and/or connections/connectors.

Optical sensors, such as infrared, ultraviolet, laser, fiber optic, visible or non-visible light may also be used to detect presence of a natural gas/oxygen fill hose in proximity to a tank fill adapter coupled to a natural gas/oxygen tank. These sensors can measure interference of a light beam, a distance, an obstruction, light differential, existence or non existence of parts, proximity, or whether a part is or is not in a particular position. Any sensor can have one or more transmitters/transceivers that communicate wirelessly such as by radio or light. These sensors can also guide manual and or automatic fuelling systems with a natural gas/oxygen fill hose to sense proximity or that a particular mechanical part is, or is not, in a particular position such as a fuelling rack, tray, arm, hose, line, articulation, or extension of hose/line or fuelling devices and or connections/connectors.

All the above safety systems, sensors, relays, triggers, micro-switches, over-rides, lock-outs, resets, and events can be continuously monitored, recorded, and all logged data can be identified with a unique ID relating to location and part number along with current time and date stamps. All recorded data can be print out upon request.

Figure 8:
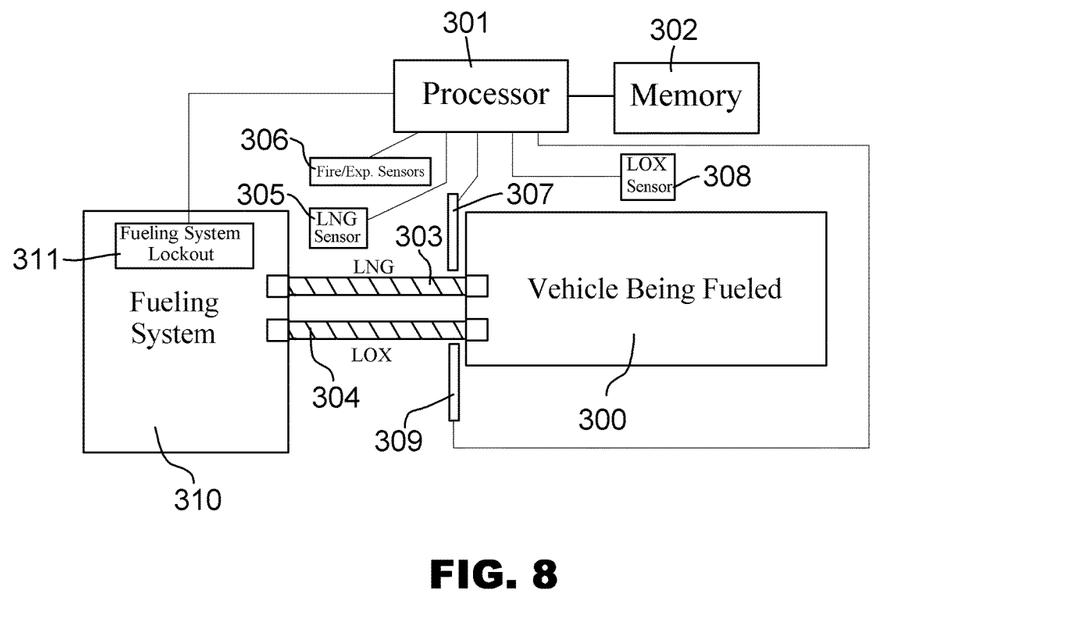
FIG. 8 shows an example of a LNG/LOX fueling safety system.

FIG. 8 shows an example of a LNG/LOX fueling safety system according to an embodiment of the present invention. The rocket, aircraft or other vehicle 300 being fueled is attached to a fueling system 310 with an LNG fuel line 303 and a LOX oxidizer line 304. The fueling system 310 has a safety lockout 311 that can very rapidly stop fueling (in the order of milliseconds or faster). A processor 301 or other logic in conjunction with a memory 302 acts as a logic circuit. The processor is coupled to a fire/explosion sensor 306, a LNG presence sensor 305 and a LOX oxygen above ambient concentration sensor 308. The processor 301 is also coupled to an LNG hose proximity detector 307 and a LOX hose proximity sensor 309. The processor 301 or logic circuit, upon sensing a dangerous condition from any one of the coupled sensors, immediately (in microseconds) sends a command to the fueling system lockout 311 to stop fueling. Fast shutoff valves in the fueling system 310 can shut off fueling flow as quickly as mechanically possible. Many other sensors and sensor types previously discussed can be incorporated into this system as needed. These can include motion detectors and detectors on isolation valves.

Several descriptions and illustrations have been presented to aid in understanding the features of the present invention. One with skill in the art will realize that numerous changes and variations may be made without departing from the spirit of the invention. Each of these changes and variations is within the scope of the present invention.

I claim:

1. A rocket or aircraft fueling safety system for vehicles using Liquefied Natural Gas (LNG) fuel along with an oxidizer other than air comprising:
    a fueling system that includes LNG fuel and a liquid or solid oxidizer other than air constructed to fuel a rocket or aircraft;
    a first sensor constructed to detect the presence of natural gas or LNG, said first sensor located in proximity to said fueling system;
    a second sensor constructed to detect the oxygen concentration a predetermined amount above ambient air concentration, said second sensor located in proximity to said fueling system;
    a logic system that combines inputs from the first and second sensors such that said fueling system is placed into a lock-out state upon detection of LNG by the first sensor or upon detection of oxygen above said predetermined amount by the second sensor;
    a manual override system constructed to remove and disable said lock-out state.

2. The fueling safety system of claim 1 further comprising a third sensor being a fire or explosion sensor, the third sensor also being coupled to said logic system such that said fueling system is placed into a lock-out state upon detection of fire or explosion from said third sensor.

3. The fueling safety system of claim 2 wherein the fire or explosion sensor is chosen from the group consisting of optical and ultrasonic.

4. The fueling safety system of claim 3 wherein the fire or explosion sensor is an infrared sensor.

5. The fueling safety system of claim 1 wherein the first sensor is chosen from the group consisting of optical sensors and chemical detectors.

6. The fueling safety system of claim 1 wherein the second sensor is a chemical detector.

7. The fueling safety system of claim 1 further comprising a proximity sensor constructed to detect proximity of an LNG fuel hose or a liquid oxygen hose to a coupling on said rocket or aircraft, wherein the proximity sensor is also coupled to said logic system causing the fueling system to be placed in said lock-out state when the fuel hose or liquid oxygen hose is not in proximity to said coupling.

8. A rocket or aircraft fueling safety system for vehicles using Liquefied Natural Gas (LNG) fuel along with an oxidizer other than air comprising:
    a natural gas or LNG fueling hose supplying fuel to said rocket or aircraft;
    a liquid oxidizer hose supplying liquid oxidizer to said rocket or aircraft;
    a first sensor constructed to detect the presence of natural gas or LNG, said first sensor constructed to be located in proximity to the fueling system;
    a second sensor constructed to detect the oxygen concentration a predetermined amount above ambient air concentration, said second sensor constructed to be located in proximity to said fueling system;
    a logic system that combines inputs from the first and second sensors such that said fueling system is placed into a lock-out state upon detection of LNG by the first sensor or upon detection of oxygen above said predetermined amount by the second sensor.

9. The fueling safety system of claim 8 further comprising a third sensor being a fire or explosion sensor, the third sensor also being coupled to said logic system such that said fueling system is placed into a lock-out state upon detection of fire or explosion from said third sensor.

10. The fueling safety system of claim 9 wherein the fire or explosion sensor is chosen from the group consisting of optical and ultrasonic.

11. The fueling safety system of claim 9 wherein the fire or explosion sensor is an infrared sensor.

12. The fueling safety system of claim 8 wherein the first sensor is chosen from the group consisting of optical sensors and chemical detectors.

13. The fueling safety system of claim 8 wherein the second sensor is a chemical detector.

14. The fueling safety system of claim 8 further comprising a proximity sensor constructed to detect proximity of natural gas or LNG fuel hose or a liquid oxygen hose to a coupling on said rocket or aircraft, wherein the proximity sensor is also coupled to said logic system causing the fueling system to be placed in said lock-out state when the fuel hose or liquid oxygen hose is not in proximity to said coupling.

15. The fueling safety system of claim 8 further comprising a manual override system constructed to remove and disable said lock-out state.

16. A rocket or aircraft fueling safety system for vehicles using Liquefied Natural Gas (LNG) fuel along with Liquid Oxygen (LOX) comprising:
    a first sensor constructed to detect the presence of natural gas or LNG, said first sensor constructed to be located in proximity to a fueling system;
    a second sensor constructed to detect oxygen concentration a predetermined amount above ambient air concentration, said second sensor constructed to be located in proximity to said fueling system;
    a third sensor constructed to detect fire or explosion;
    a fourth sensor constructed to detect proximity of an LNG hose to an LGN coupling on said rocket or aircraft;
    a fifth sensor constructed to detect proximity of a LOX hose in proximity to a LOX coupling on said rocket or aircraft;
    a logic system that combines inputs from the first, second, third, fourth and fifth sensors such that said fueling system is placed into a lock-out state upon detection of LNG by the first sensor, or upon detection of oxygen said predetermined amount above ambient concentration by the second sensor, or by detection of fire or explosion by the third sensor, or by detection of non-proximity of an LNG hose to said LNG coupling by said fourth sensor, or by detection of non-proximity of a LOX hose to said LOX coupling by said fifth sensor.

17. The fueling safety system of claim 16 wherein the fire or explosion sensor is chosen from the group consisting of optical and ultrasonic.

18. The fueling safety system of claim 16 wherein the first sensor is chosen from the group consisting of optical sensors and chemical detectors.

19. The fueling safety system of claim 16 wherein the second sensor is a chemical detector.

20. The fueling system of claim 16 further comprising a motion sensor coupled to said logic system, wherein said logic system is configured to place the fueling system into a lockout state upon detecting motion of the rocket or aircraft above a predetermined amount.

* * * * *